United States Patent
Westerman et al.

(10) Patent No.: US 6,270,603 B1
(45) Date of Patent: Aug. 7, 2001

(54) REPAIR METHOD FOR UNIFORMLY HEATING COMPOSITE STRUCTURE

(75) Inventors: Everett A. Westerman, Auburn; Phillip E. Roll, Kent, both of WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 08/468,595

(22) Filed: Jun. 6, 1995

Related U.S. Application Data

(63) Continuation-in-part of application No. 08/018,466, filed on Feb. 16, 1993, now Pat. No. 5,442,156, which is a continuation of application No. 07/682,637, filed on Apr. 9, 1991, now abandoned.

(51) Int. Cl.[7] .................................................. B32B 35/00
(52) U.S. Cl. ............................................. 156/94; 156/323
(58) Field of Search ........................... 156/94, 98, 323; 425/11, 14; 29/402.09, 402.11; 244/133

(56) References Cited

U.S. PATENT DOCUMENTS

| | | |
|---|---|---|
| 2,185,692 | 1/1940 | McCleary . |
| 2,294,010 | 8/1942 | Van Daam ........................ 219/535 |
| 2,445,660 | 7/1948 | Bruestle . |
| 2,489,643 * | 11/1949 | Hunter ................................. 219/535 |
| 3,014,117 | 12/1961 | Madding ............................. 219/535 |
| 3,016,446 | 1/1962 | Kalbach . |
| 3,388,016 * | 6/1968 | Murray ................................. 156/94 |
| 3,569,669 | 3/1971 | March . |
| 3,661,683 * | 5/1972 | Engel ................................... 156/94 |
| 3,869,594 | 3/1975 | Shively . |
| 3,875,373 | 4/1975 | Lowery et al. . |
| 4,198,559 | 4/1980 | Walter et al. . |
| 4,201,218 | 5/1980 | Feldman et al. .................... 219/528 |
| 4,352,707 | 10/1982 | Wengler et al. ....................... 156/94 |
| 4,408,558 | 10/1983 | Faber et al. . |
| 4,511,425 | 4/1985 | Boyd et al. . |
| 4,524,757 | 6/1985 | Buckley . |
| 4,588,626 | 5/1986 | Cologna et al. . |
| 4,720,313 * | 1/1988 | Wegehaupt ......................... 156/323 |
| 4,808,253 | 2/1989 | Mimbs ................................. 156/98 |
| 4,820,564 | 4/1989 | Cologna et al. . |
| 4,916,880 | 4/1990 | Westerman . |
| 4,961,799 | 10/1990 | Cologna et al. . |
| 4,978,404 | 12/1990 | Westerman . |
| 4,987,700 | 1/1991 | Westerman et al. . |
| 5,034,254 | 7/1991 | Cologna et al. . |
| 5,190,611 | 3/1993 | Westerman et al. . |
| 5,207,541 | 5/1993 | Westerman et al. . |

* cited by examiner

*Primary Examiner*—Jeff H. Aftergut
*Assistant Examiner*—Gladys Piazza
(74) *Attorney, Agent, or Firm*—John C. Hammar

(57) ABSTRACT

We control the cure temperature within ±15° F. (8° C.) for organic resin matrix composites with a thermal diffusion apparatus which contains a liquid fluid transfer medium to convey heat from an immersed resistance heater to the repair site. Uniform heating of the repair site occurs despite differences in the underlying structure of the repair site, such as the location of underlying spars or other structural features or variations in the skin thickness, because of natural convection within the heat transfer fluid. The fluid transfer medium preferably is a solid, at ambient temperature, but melts at a relatively low, elevated temperature below the cure temperature. We achieve uniform heating that is necessary for suitable repairs to temperatures of at least about 350° F. (177° C.) and simplify monitoring of the repair site temperatures because of the uniform heating we naturally achieve.

18 Claims, 3 Drawing Sheets

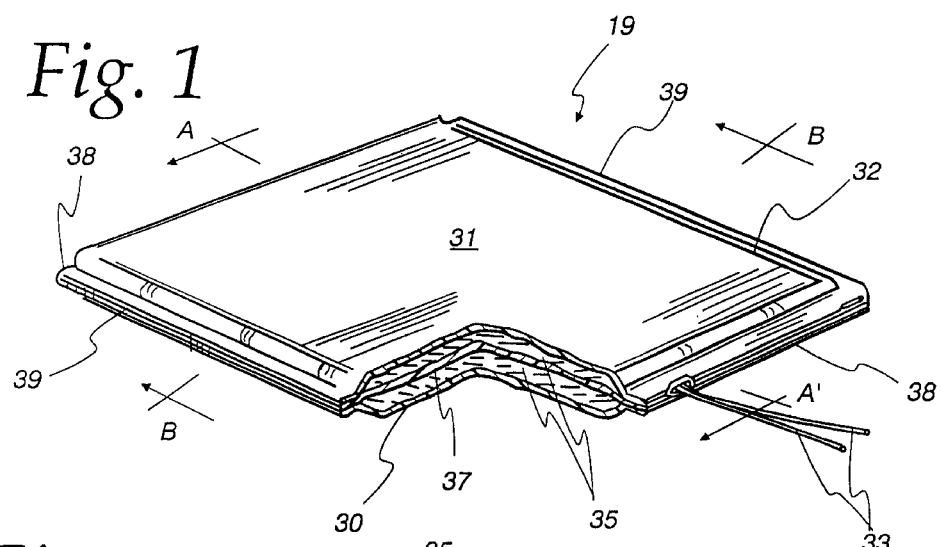
Fig. 1
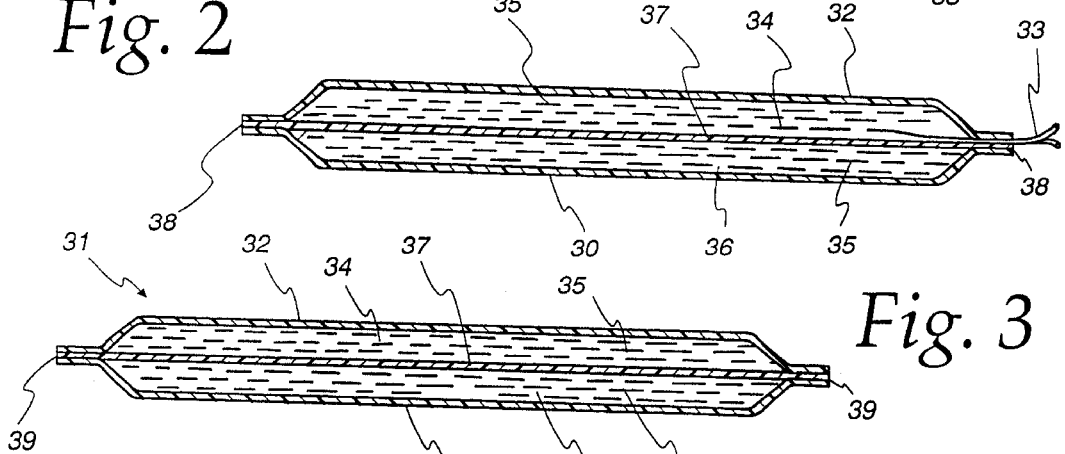
Fig. 2
Fig. 3
Fig. 4
Fig. 5
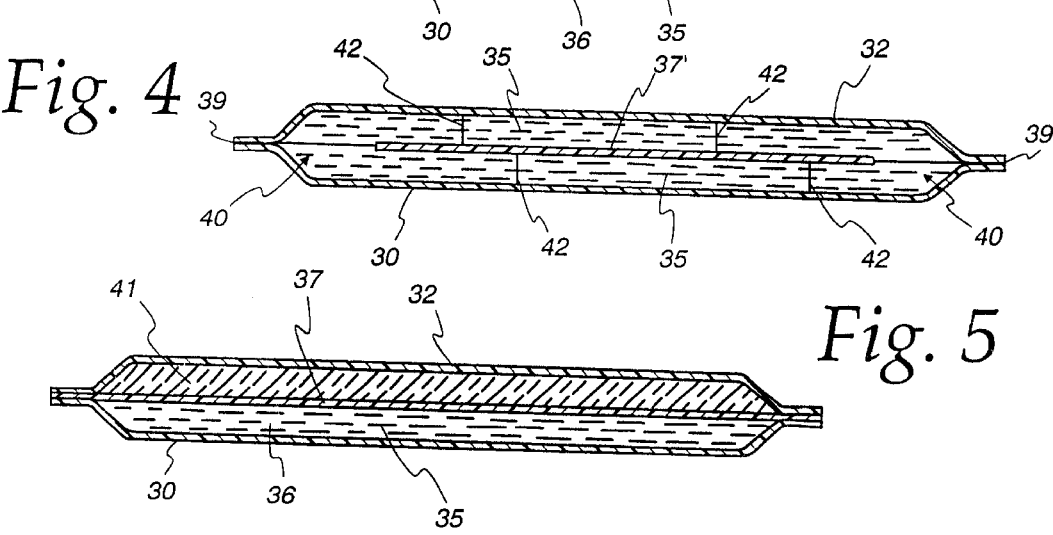

REPAIR METHOD FOR UNIFORMLY HEATING COMPOSITE STRUCTURE

REFERENCE TO RELATED APPLICATIONS

The present application is a continuation-in-part application based upon U.S. patent application Ser. No. 08/018,466, filed Feb. 16, 1993, now U.S. Pat. No. 5,442,156 which was a continuation of U.S. patent application Ser. No. 07/682,637, filed Apr. 9, 1991, now abandoned.

TECHNICAL FIELD

The present invention relates to the repair of composite structures, and, particularly, to a method for uniformly heating repair sites in resin composite structures for the curing of resins used in such repair.

BACKGROUND ART

Composite structures of laminated material are increasingly being used in industry, and, particularly, in the aircraft industry. From time to time, the composite structure will be damaged and need repair in the field rather than replacement of an entire panel or subassembly in depot maintenance. Repair typically involves the removal of damaged material and covering the repair site with layers of woven material, such as graphite or carbon fiber, which have been impregnated with an organic matrix resin, such as epoxy. The new material and an adhesive, if necessary, are pressed into place and cured at an elevated temperature. Pressure conforms the new patch material to the original structure and heat properly sets the resin. When correctly done, such curing involves a controlled heating profile to a predetermined temperature which is held for a sufficient time to complete the resin's curing reaction followed by a controlled cooling profile.

The advantages of designing with composite materials include the ability to tailor the amount of material used to obtain efficient structural components. Many composite designs have been developed that have nonuniform cross-sections (i.e., ply dropoffs, planks, stiffening elements, etc.). The heat sinks from these non-uniform cross-sections require increased thermal control to maintain uniform cures. Curing of resins used in composite materials (including those in the repair patches) is an exothermic reaction that requires heat to start the reaction. Without adequate control of the heating or cooling, hot spots or cold spots develop in the repair. Conventional heat blankets and control techniques that seek to reduce cold spots tend to increase problems associated with hot spots or visa versa. The autoclave provides elevated positive laminating pressures and the large thermal mass needed for precise temperature control. Existing portable repair equipment has neither the elevated pressures nor the inherent temperature control capabilities of the autoclave. Consequently, repairs to complex structures are often inadequate because of poor temperature control and nonuniform temperatures in the repair zone, thereby reducing the structural capability of the repair.

Controlling the pressure applied and the temperature profile for a repair is important to the strength of repair. Inadequate temperature control can substantially impact repair strength. Heating too fast can shock and weaken the composite structure. Curing temperatures lower than desired result in poor bonding and temperatures higher than desired can result in burning both the repair patch and the material surrounding the repair. Fluctuating temperatures, especially during the cure, can produce a combination of these effects.

A repair site may be heated by placing electrical resistance heating blankets directly over the entire repair area. Such heating blankets tend to heat the site unevenly, however either because portions of the structure conduct heat away from the site while other portions retain heat or because in the heater provides variable uneven heat. In one study, we heated an aircraft skin by direct contact with a heating blanket and detected a 95° F. (52° C.) temperature variation under the blanket when the skin was heated to a nominal 360° F. (183° C.). In a second study, where we inserted a copper foil heat conductor between the heating blanket and the aircraft skin, we still found a 65° F. (35° C.) variation. Proper curing is impossible with such a large temperature variation.

The difficulties of achieving uniform heating are compounded by uneven thermal characteristics at a repair site. For example, a portion of a repair site may consist of aircraft skin only, while another portion may consist of aircraft skin having an underlying support member i.e., a spar. The support member tends to transfer heat away from the skin to which it is attached causing uneven temperatures across the repair site. Multi-zone heating blankets have been used to provide different amounts of heat to different portions of a repair site in an attempt to provide uniform temperatures to areas having varying thermal characteristics. Such multi-zone heating blankets, however, require complex control systems for the multiple heating zones and, importantly, must be specifically configured to provide heating characteristics corresponding to the thermal characteristics of different areas of the repair site. Providing complex controls and many different configurations of multi-zone heating blankets is a problem for repair centers. The repair surface must be mapped with respect to its thermal characteristics to know what regions to heat to what temperature and at what power to achieve overall temperature uniformity in the structure. This mapping is difficult and is a function of the environment where the repair is done.

Another system for repairing composite structures is disclosed in U.S. Pat. No. 4,808,253 to Mimbs. The Mimbs system uses a heating blanket on top of a thermally conductive fluid-filled envelope to distribute heat and pressure to the repair site. As disclosed, the envelope is primarily used to conform the repair assembly to contoured shapes. The Mimbs system does not result in a sufficiently accurate temperature control. Overlaying the envelope with a conventional heating blanket creates multiple heat transfer interfaces resulting in inefficient and inconsistent heat transfer to the fluid in the envelope. Mimbs lacks a thermometer to monitor the temperature of the repair site.

A need exists for composite repair apparatus which can achieve controlled heating and sufficiently sustain substantially uniform temperatures for appreciable periods of time to achieve proper bonding between the patch material and the structure being repaired.

SUMMARY OF THE INVENTION

The repair method of the present invention provides a substantially uniform temperature to a composite repair site on an aerospace structure by relying on a heating apparatus which uses a convective heat transfer fluid to convey heat from a resistance heater contained in the fluid to the repair surface. This heating apparatus naturally avoids hot spots or cold spots because of the convection currents that appear in the transfer fluid. With this method, we have achieved controlled heating or cooling profiles and have maintained temperatures substantially constant across the entire repair site for the time required to achieve a quality cure, even to temperatures of about 360° F.±15° F. (183±8° C.). The apparatus also has a large thermal mass so that it becomes more difficult to make significant changes in the temperature rapidly when the causes for such changes are heat sinks and structural variations in the composite repair site irrespective of the placement of underlying spars or heat sinks surrounding the repair site.

The heating apparatus used in the repair method of the present invention comprises, as a single unit, a sealed bladder containing a thermally conductive fluid and an electrical heating element immersed in the fluid. The multiple heat transfer interfaces of prior arrangements such as Mimbs are avoided by the construction of the apparatus in which the heating element is in substantially direct thermal contact with the transfer fluid. As electrical power is applied to the heating element, the fluid is efficiently heated and the heat transferred to a repair site can be accurately monitored to achieve the desired cure temperature. Because the heating element is immersed in the fluid, heat from both sides of the heating element is absorbed by the fluid, thereby increasing the heating efficiency. Substantially equal temperatures are maintained across the repair site by conductive and convective heat transfer through the thermally conductive fluid, even on repair sites having structures that otherwise present nonuniform heat transfer characteristics.

The source of electrical power for the heating element is generally external to the bladder and power is conveyed to the heating element by wires which pass through seals at the surface of the bladder. Arrangements are also provided for pressing the heating apparatus against the repair site to improve bonding. The heat applied to the repair site and patch is monitored by a temperature sensing device at the repair site to regulate the power applied to the heater.

The seals for the bladder use silicon-based adhesives or vulcanization. The bladder seals can include a pair of semi-rigid frames having substantially the same perimeter as the bladder. The frames that compress the bladder surfaces contain the thermally conductive transfer fluid.

The heating element comprises a resistance wire which is substantially uniformly distributed on a support sheet. The support sheet is attached to the inside of the bladder.

In one embodiment, the support sheet is attached around an interior perimeter of the bladder as a diaphragm to form two reservoirs which are sealed from one another. One of the reservoirs contacts the repair site, and the other provides increased thermal mass to improve the heating characteristics of the apparatus. In an alternative embodiment, the support sheet is porous or perforated to allow fluid to circulate between the reservoirs and around the heating element. Additionally, flexible supports can be attached between the support sheet and the bladder internal surface to control the separation distance between the bladder surface and the heating element. The resistance wire of the heating element may even be suspended in the bladder without being attached to a support sheet so that the thermally conductive fluid is essentially in a single reservoir.

The heating apparatus may have its bladder surface incorporate the flexible electrical heating element, or have one surface of heating element in contact with the fluid with insulation on the other side, to improve thermal efficiency of the apparatus over prior art heating blankets.

BRIEF DESCRIPTION OF THE DRAWINGS

FIG. 1 is a perspective view of the preferred thermal diffusion apparatus we use to apply heat to a repair site.

FIG. 2 is an end sectional view of the apparatus of FIG. 1.

FIG. 3 is a side sectional view of the apparatus of FIG. 1.

FIG. 4 is a side sectional view of a second embodiment of a thermal diffusion apparatus.

FIG. 5 is a sectional view of a third embodiment of a thermal diffusion apparatus.

DETAILED DESCRIPTION OF THE PREFERRED EMBODIMENT

The repair of composite structures is a difficult procedure requiring relatively precise temperatures for predetermined time intervals to produce a satisfactory repair. Before describing the novel heating apparatus of the present invention, we will describe the repair process and the desired heating profile to complete a repair so that the necessity for accurate temperature control can be appreciated.

Figure 6:
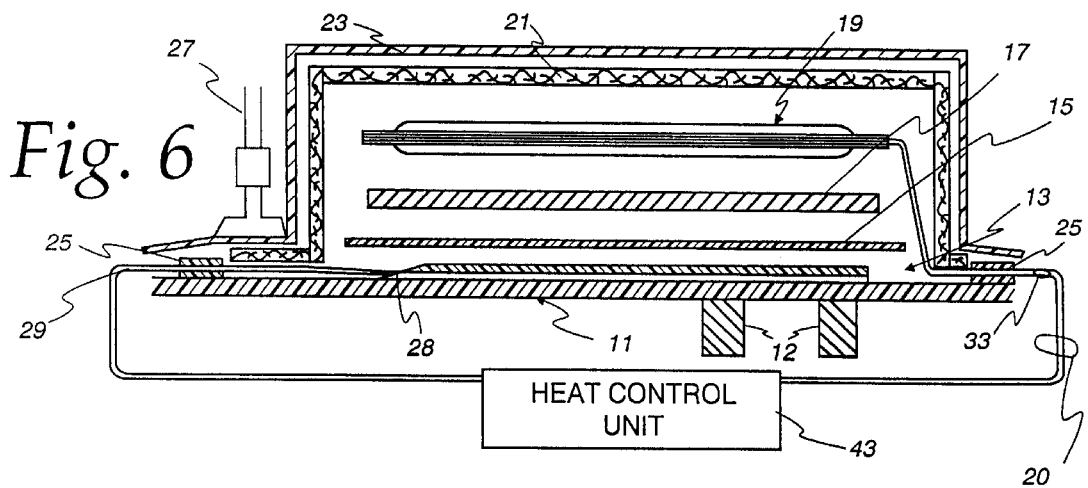
FIG. 6 is a sectional view of schematic of a typical repair of composite structures.

FIG. 6 is a sectional view of an arrangement of components used in the repair of a composite material substrate 11 having underlying support members 12. After the area to be repaired is cleaned of damaged material and properly shaped, a patch 13, comprising layers of resin impregnated repair material is placed over the prepared area. On top of the patch 13, a layer of porous separator film 15 is added to promote the separation of the components from the patch 13 at the conclusion of the repair process. Above separator film 15 an optional caul plate 17 may be used to evenly distribute pressure applied to the patch 13. Above the caul plate 17, heating unit 19 provides controlled heating of patch 13 and the surrounding substrate 11 to cure the adhesive/resin for a good bond between the substrate and the patch. Heating unit 19 is an electrical resistance heat blanket which receives electrical power from a heat control unit 43 via electrical conductors 20. The heating unit 19 is covered with breather plies 21 which are, in turn, covered with a vacuum sheet 23. Vacuum sheet 23 is sealed to the substrate 11 around the perimeter of the repair site by a sealing compound 25 and a vacuum probe 27 is applied to the vacuum sheet. A vacuum source (not shown) is connected to the probe 27 and withdraws gases between the vacuum sheet 23 and the substrate 11. Breather plies 21 provide a path to promote the removal of these gases. The lowered pressure between the vacuum sheet 23 and the substrate 11, brings all of the repair components into tight physical contact; and thereby applies a predetermined pressure on the patch 13 to aid in proper bonding. Temperature sensing device 28, such as a thermocouple, is electrically connected outside of the vacuum sheet 23 by conductors 29 to a heat control unit 43, which responds to signals from the temperature sensing device 28 to control the amount of power supplied to heating unit 19 over conductors 20.

If additional pressure is required for the proper consolidation of the repair patch, then an additional bagging system can be assembled over the vacuum bagging system just described. In such an arrangement, vacuum sheet 23 functions as a diaphragm and positive pressure can be exerted over it in excess of atmospheric pressure in a zone defined by vacuum sheet 23 and an outer pressure membrane. Alternately a caul plate and static weight or some other pressure foot can simply be applied over the vacuum sheet or within the bag arrangement in association with caul plate 17.

While the patch 13 is shown overlying the substrate, the patch 13 might also be inset into a scarfed recess in the surface of the substrate or be a plug or insert sized to fill a hole in the substrate. Repair of holes and other damage is described, for example, in U.S. Pat. Nos. 4,916,880; 4,978,404; 4,987,700; 5,207,541; 5,109,611; 4,820,564; 4,961,799; 5,034,254; and 4,588,626 which we incorporate by reference.

The patch 13 may be a thermoset or thermoplastic, but should be a material where bagging is unnecessary on the blind side to complete the repair, since the merits of the invention are an improved method for field repair. For thermosets, the resin most commonly used would be epoxy. For thermoplastics we prefer low volatile resins like PEEK or ULTEM.

Figure 7:
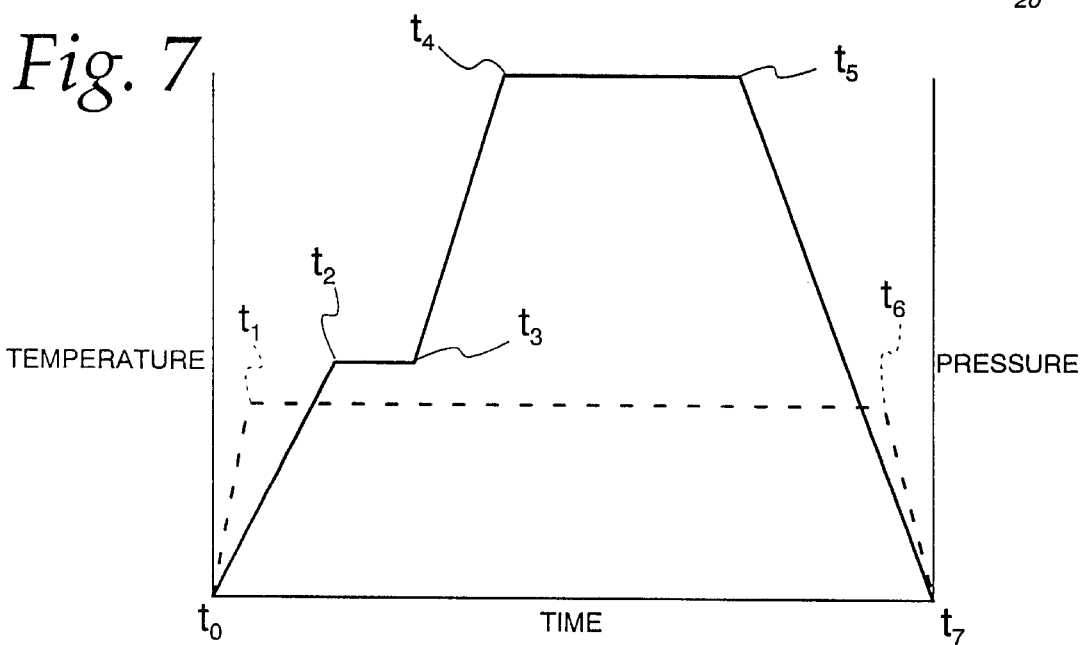
FIG. 7 shows typical pressure and temperature cycles used in composite repair.

FIG. 7 shows the preferred heat and pressure profile for the repair site as a function of time. The dotted line represents pressure applied to patch 13 and the solid line represents the temperature of the repair site. At $t_0$, the starting time, we begin to evacuate the volume within vacuum sheet 23 and begin to heat the repair site at the preferred rate of about 1–5° F. (0.5–2.5° C.)/min. At a time $t_1$ the evacuation is complete and further suction merely maintains a constant pressure on the patch 13 (i.e., maintains the vacuum condition in the volume). At $t_2$ typically about 150° F. (66° C.) for an epoxy path, we hold the temperature constant until time $t_3$ in a hot, debulking step. Hot debulking draws reaction gases out of the repair plies and compacts them to ensure the quality of the completed patch. After debulking at $t_3$, the temperature is then increased toward the curing temperature at a rate of 1–5° F. (0.5–2.5° C.)/min. When we reach the curing temperature (about 350° F. (177° C.), we hold the temperature constant for a predetermined period of time to allow the patch to cure (typically it undergoes a thermally activated chemical reaction) before we cool at a rate of 1–5° F. (0.5–2.5° C.) ending at room temperature at $t_7$ to complete the repair. The pressure is released at $t_6$.

During both the heating and curing phases the temperature over the entire repair site 11 should be substantially uniform to assure proper bonding. The present invention is a thermal diffusion apparatus (TDA) which substantially evenly heats the patch and the substrate of a repair site, is capable of providing a curing temperature of 350° F. (177° C.) or more, and is controllable to provide the desired temperature control necessary to assure good bonding.

FIG. 1 is a perspective view of a preferred TDA which comprises a sealed, silicone rubber bladder 31 containing a thermally-conductive medium 35 which, preferably, is a liquid at the curing temperatures of interest. Beeswax, which melts at approximately 140° F. (60° C.) is a suitable thermally-conductive medium which can achieve the relatively high cure temperature.

FIG. 2 is a sectional view of TDA 19 taken along section line A–A' of FIG. 1. The thermal diffusion apparatus 19 includes an electrical heating element 37 which is energized via a pair of conductors 33. Heating element 37 comprises a cloth-reinforced, silicone rubber sheet with a length of resistive wire, such as nichrome wire, embedded in the silicone on one surface. To produce even heating, the nichrome wire is substantially uniformly disposed over the surface of the sheet. Bladder 31 is constructed of two sheets 30 and 32 of silicone rubber, each of which has an area slightly larger than that of heating element 37. The bladder 31 is formed by bonding upper sheet 32, lower sheet 30 and the heating element 37 at the perimeter of the heating element 37. Other arrangements might be used, of course, with the object being confining the heating element within a sealable volume for the heat transfer fluid 35. The conductors 33 extend through the seam and are sealed in the bonding process. Bonding between the sheets is achieved by a heat curing process such as vulcanizing. The upper and lower sheets 32 and 30 are slightly larger than the heating element 37 so that an upper reservoir 34 is formed between the heating element 37 and the upper sheet 32, and a lower reservoir 36 is formed between the heating element 37 and the lower sheet 30. The upper and lower reservoirs of bladder 31 are filled with thermally-conductive fluid 35, and usually are isolated from each other. The amount of fluid in each reservoir is such that approximately one-half inch is present above and below heating element 37 when the filled bladder 31 rests as shown on a horizontal surface. FIG. 3 is a sectional view of bladder 31 taken along section lines B–B' of FIG. 1. It can be seen from FIGS. 2 and 3 that heating element 37 of this embodiment is sealed around the entire internal perimeter of bladder 31 and thus prohibits any fluid communication between upper reservoir 34 and lower reservoir 36.

As electrical current runs through conductors 33 and the resistive wire of heating element 37, the thermally conductive fluid 35 heats quickly through the close contact between the heating element 37 and the fluid. When the bladder 31 is placed over a patch and substrate, relatively uniform temperature is maintained at the patch contacting surface because of the proximity of the heating element to that surface and the conductive and convective heat exchange through the fluid within the bladder 31. Although the upper reservoir may not be in contact with the patch being cured, it provides additional thermal mass to stabilize the temperature variation in the heating element. In an arrangement similar to that shown in FIG. 6 using the heating apparatus of FIG. 1, in which the 1200 watt heating element 37 was capable of producing a heat flux of about 7.5 to 10 watts per square inch, we followed the temperature profile of FIG. 7, holding the curing temperature at about 360±15° F. (182±8° C.) despite the fact that the repair site included the underlying heat sinks 12 in portions of the area. The uniformity we achieve permits us to monitor the repair site temperature using a single thermocouple, e.g., 28 of FIG. 6, rather than an array of thermocouples dispersed over the repair site as is required with conventional systems.

In the previously described embodiment, two separate reservoirs 34 and 36 of thermally-conductive fluid are employed to provide accurate and uniform heating. FIG. 4 shows a side, sectional view taken along section line B–B' of FIG. 1 of a second embodiment of the heating apparatus of FIG. 1. In the second embodiment, bladder 31 comprises a single reservoir of thermally-conductive fluid in which heating element $37^1$ is immersed. The heating apparatus of FIG. 4 allows thermally-conductive fluid 35 to circulate throughout the single reservoir of the bladder 31.

The heating apparatus of FIG. 4 is assembled in a manner substantially similar to that of the prior embodiment, except that the heating element $37^1$ is not as wide as the distance between edges 39. The heating element $37^1$ extends from one edge 38 to the opposite edge 38 of the bladder and is sealed into these edge seams. The heating element $37^1$ does not, however, extend from edge 39 to the opposite edge 39. Accordingly, two regions 40 are left open for fluid circulation around the heating element 37[1]. Of course, circulation and fluid communication between the reservoirs can be achieved in other ways including providing pores or perforations in the sheet on which the resistive wire is mounted or using a membrane for the sheet to which the heat transfer fluid 35 is permeable. Fluid circulation around the heating element 37[1] tends to improve the ability of TDA 19 to provide uniform temperatures.

The heating element may become displaced on contoured or irregular surfaces. To limit the possible displacement of heating element 37[1], flexible supports 42 can be bonded between the heating element 37[1] and the interior of the bladder. The supports 42 control the spacing between the upper and lower bladder surfaces 32 and 30 and do not substantially restrict fluid circulation.

FIG. 5 shows an additional embodiment in which one side of heating element 37 is exposed directly to the thermally-conductive fluid 35 as in the prior embodiments, and the other side of the heating element is insulated. The apparatus of FIG. 5 is assembled in a manner substantially similar to that of FIGS. 1 through 3, except that the upper reservoir is filled with insulating material 41 such as fiberglass bats or foam insulation before the top sheet 32 of the bladder is bonded to the heating element 37 and the bottom sheet 30. The bottom reservoir is filled as before with thermally-conductive fluid 35. Although the apparatus of FIG. 5 does not have as large a thermal mass as prior embodiments, the integration of insulation, heating element and temperature-conductive fluid provides for efficient heating and uniform temperature distribution characteristics.

Figure 8:
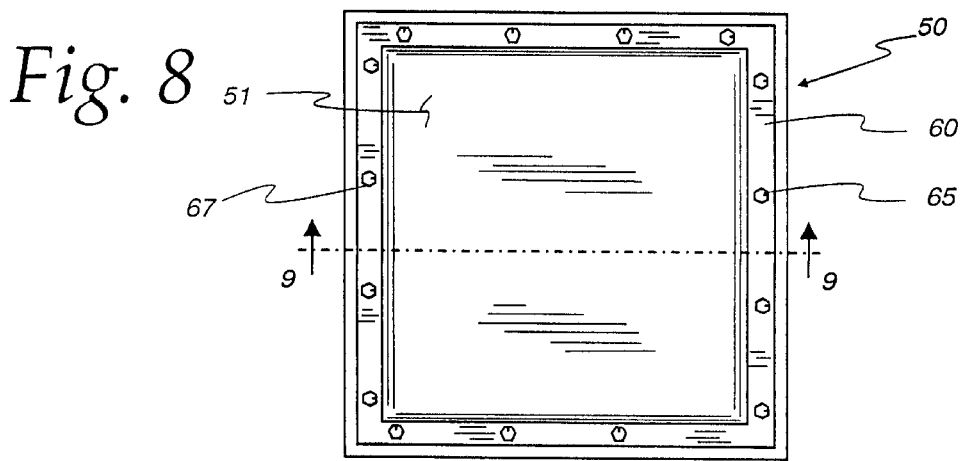
FIG. 8 is a plan view of a thermal diffusion apparatus having a compression seal.
Figure 9:
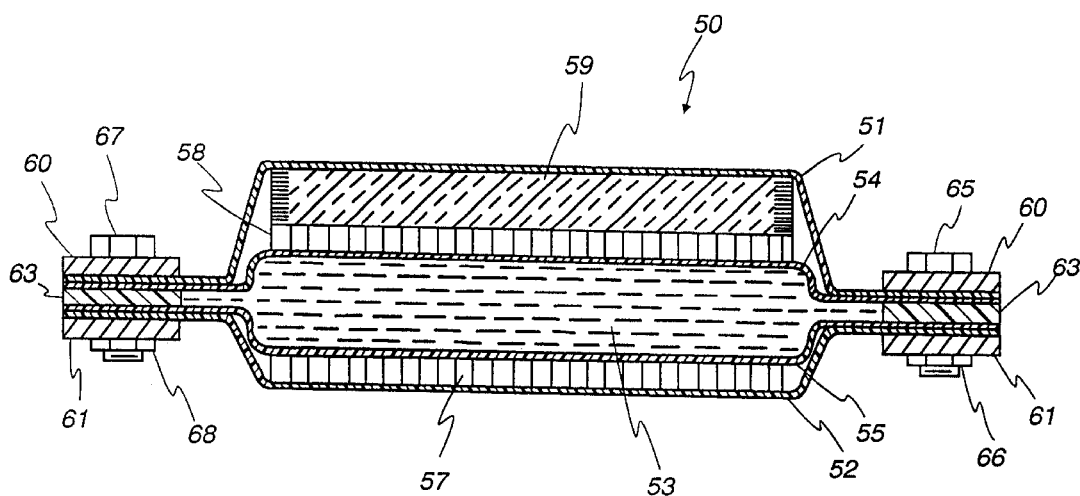
FIG. 9 is a cross-sectional view of the apparatus of FIG. 8.

Construction of the exterior bladder of the heating apparatus from relatively thin (0.06") sheets of silicone rubber makes the bladder surfaces flexible for ease of use, but beeswax may diffuse through the sheets. FIGS. 8 and 9 show a heating apparatus 50 which incorporates an internal bladder or container made from two sheets, 54 and 55, of a polyamide film such as UPILEX or KAPTON prevent such leaking.

The heating capability of the apparatus 50 is provided by a pair of electrical heating elements 57 and 58. Heating element 57 is disposed between the inner bladder 54, 55 and one surface 52 of the external bladder. The other heating element 58 is disposed on the opposite side of the inner bladder 54, 55 so that at least a portion of the inner bladder is "sandwiched" between the two heating elements. A layer of insulating material 59 is disposed between the heating element 58 and the sheet 51 of the outer bladder. In use, the surface 52 of the outer bladder is placed over the repair site.

The heating apparatus 50 is sealed by a mechanical sealing apparatus which may be used in conjunction with the previously mentioned sealing arrangements or may be provided as the exclusive bladder seal. The mechanical sealing apparatus comprises a pair of rectangular frames 60 and 61 of semi-rigid material, such as wood, plastic or aluminum, and a silicone rubber gasket 63 of the same shape as frames 60 and 61. During construction, the gasket 63 is placed between the polyimide sheets 54 and 55. The silicone rubber sheets 51 and 52 of the outer bladder are then placed on top of and beneath (FIG. 9 orientation) the gasket 63 and polyimide sheet 54 and 55 assembly. Frames 60 and 61 are then placed over and under the combined gasket and film combination, and threaded bolts, e.g., 65 and 67, are inserted through prefabricated matching holes in the frames 60 and 61 and the flexible members 51, 52, 54, 55 and 63. Compression forces are applied to the flexible members by means of threaded nuts 66 and 68 attached to the threaded bolts 65 and 67, respectively, or by other suitable means, as will be understood.

Figure 10:
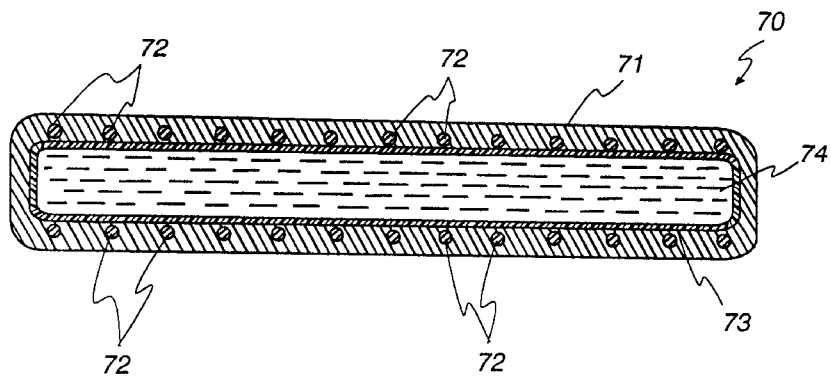
FIG. 10 is a sectional view of another thermal diffusion apparatus.

FIG. 10 is a cross-sectional view of a heating apparatus 70 which includes electrical resistance heating wires 72 embedded in the inner surface of the silicone rubber outer bladder 71. The heating wires 72 surround an inner, polyimide bladder 73 which holds the thermally conductive fluid 74 (typically, beeswax). As with the heating apparatus 50, heat is applied to both surfaces of the thermally conductive fluid bladder 73. Heat application to both surfaces increases the heating capacity of the apparatus over that of a single heating surface while gaining advantage of the heat conveying properties of the thermally conductive fluid 74.

Beeswax is the preferred heat transfer fluid because it is stable to relatively high temperatures, melts readily, has a high heat capacity, yet is solid a room temperature. Being a solid at room temperature facilitates storage of the apparatus as well as its transport to and placement on the repair site. If, for example, mineral oil were used as the heat transfer fluid, the apparatus would be liquid-filled at room temperature and would be a heavy and awkward balloon.

We tested several other heat transfer media that offered phase changes (solid to liquid) between room temperature and the cure temperature, but we found beeswax to be optimal. A bismuth/tin alloy heated to about 500° F. (260° C.), but we could not hold this temperature to within ±50° F. (28° C.). Silicone grease proved to be in-effective at transferring heat to the repair site. While eutectic metal salts are candidates for the heat transfer fluid, we have been successful with beeswax.

We have discovered that uniform heating is achievable despite variations to the thickness of the substrate and despite the presence or absence of underlying structure that functions as a heat sink. The natural convection of the fluid on the apparatus assures substantially uniform temperatures.

The bladder is flexible so that, when the heat transfer medium is a liquid, the bladder conforms to the contour of the underlying structure in the repair site. This feature is important because most aerospace surfaces are curved and many have complex curvature. Rigid equipment would leave gaps and would make uniform heating more difficult. We prefer a heat transfer medium like beeswax because it changes phase from solid to liquid at a relatively low temperature where the repairman can still readjust the bladder without getting burned, if he detects placement anomalies.

While a preferred embodiment of the invention has been illustrated, it will be obvious to those skilled in the art that various modifications and changes can be made without departing from the scope of the invention as defined in the appended claims.

We claim:

1. A method for obtaining substantially uniform temperatures in the repair of damaged areas in a repair site using a resin composite for field repair of aerospace structure despite the fact that the repair site includes one or more underlying spars or other structural features and despite variations in the thickness of the substrate at the repair site, comprising the steps of:

(a) preparing a repair site including laying up an organic matrix resin, fiber-reinforced patch over the damaged area, the matrix resin having an elevated cure temperature;

(b) covering the repair site, including the patch and underlying spars or structural features, with a thermal diffusion apparatus, the apparatus including a temperature-sensitive, phase change heat transfer medium contained within a flexible bladder capable of conforming to the contour of the repair site and an electrical resistance heater immersed in the heat transfer medium;

(c) powering the heater to increase the temperature of the repair site along a heating profile and changing the phase of the heat transfer medium from solid to liquid to promote convective and conductive heat transfer between the heater and the repair site; and (d) monitoring the temperature at the repair site and controlling the power supplied to the heater in response to the measured temperature of the repair site, including maintaining the temperature relatively constant at the cure temperature of the matrix resin for a sufficient time to promote the cure.

2. The method of claim 1 wherein the cure temperature is controlled within ±15° F. (8° C.) of a set point.

3. The method of claim 1 wherein the heating profile includes a heating cycle where the temperature of the repair site increases slowly from ambient to the cure temperature at a rate to avoid thermal shock to the repair site.

4. The method of claim 3 wherein the heating profile also includes a cooling cycle following the cure where the temperature of the repair site decreases slowly from the cure temperature to ambient at a rate to avoid thermal shock to the repair site.

5. The method of claim 4 wherein the heating rate and the cooling rate are both about 1–5° F. (0.5–2.5° C.)/minute.

6. The method of claim 2 wherein the set point is at least about 350° F. (177° C.).

7. The method of claim 1 further comprising the step of sealing the repair site with a vacuum bag that encloses the thermal diffusion apparatus.

8. The method of claim 4 wherein the cure temperature is controlled within ±15° F. (8° C.) of a set point.

9. The method of claim 1 wherein the thermal diffusion apparatus includes thermal insulation on the flexible bladder not in contact with the repair site.

10. A method for obtaining substantially uniform temperatures in the repair of damaged areas in a repair site using a resin composite for field repair of aerospace structure despite the fact that the repair site includes one or more underlying spars or other structural features and despite variations in the thickness of the substrate at the repair site, comprising the steps of:

(a) preparing a repair site including laying up an organic matrix resin, fiber-reinforced patch over the damaged area, the matrix resin having an elevated cure temperature;

(b) covering the repair site, including the patch and underlying spars or structural features, with a thermal diffusion apparatus, the apparatus including a temperature-sensitive, phase change heat transfer medium contained within a flexible bladder capable of conforming to the contour of the repair site and an electrical resistance heater immersed in the heat transfer medium;

(c) powering the heater to increase the temperature of the repair site along a heating profile and changing the phase of the heat transfer medium from solid to liquid to promote convective and conductive heat transfer between the heater and the repair site; and (d) monitoring the temperature at the repair site and controlling the power supplied to the heater in response to the measured temperature of the repair site, including maintaining the temperature relatively constant at the cure temperature of the matrix resin for a sufficient time to promote the cure wherein the heat transfer medium is beeswax.

11. The method of claim 10 wherein the cure temperature is controlled within ±15° F. (8° C.) of a set point.

12. The method of claim 10 wherein the heating profile includes a heating cycle where the temperature of the repair site increases slowly from ambient to the cure temperature at a rate to avoid thermal shock to the repair site.

13. The method of claim 12 wherein the heating profile also includes a cooling cycle following the cure where the temperature of the repair site decreases slowly from the cure temperature to ambient at a rate to avoid thermal shock to the repair site.

14. The method of claim 13 wherein the heating rate and the cooling rate are both about 1–5° F. (0.5–2.5° C.)/minute.

15. The method of claim 11 wherein the set point is at least about 350° F. (177° C.).

16. The method of claim 10 further comprising the step of sealing the repair site with a vacuum bag that encloses the thermal diffusion apparatus.

17. The method of claim 16 wherein the cure temperature is controlled within ±15° F. (8° C.) of a set point.

18. The method of claim 10 wherein the thermal diffusion apparatus includes thermal insulation on the flexible bladder not in contact with the repair site.

* * * * *